(12) United States Patent
Zhao et al.

(10) Patent No.: US 10,523,472 B1
(45) Date of Patent: Dec. 31, 2019

(54) INTERFACE CIRCUITRY

(71) Applicant: Marvell International Ltd., Hamilton (BM)

(72) Inventors: Xuan Zhao, San Jose, CA (US); Zhong Yu, Pleasanton, CA (US); Xin Ma, Milpitas, CA (US); Jackson Tek Kon Ding, San Jose, CA (US); Jacky Cheuk Yin Liu, Santa Clara, CA (US); Yihui Li, Santa Clara, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 16/150,081

(22) Filed: Oct. 2, 2018

Related U.S. Application Data

(60) Provisional application No. 62/566,958, filed on Oct. 2, 2017.

(51) Int. Cl.
*H04L 25/03* (2006.01)
(52) U.S. Cl.
CPC ............... *H04L 25/03057* (2013.01)
(58) Field of Classification Search
CPC .................................. H04L 25/03057

USPC .......................................................... 375/233
See application file for complete search history.

(56) References Cited

U.S. PATENT DOCUMENTS

| | | | |
|---|---|---|---|
| 6,819,612 B1* | 11/2004 | Achter ................... | G11C 7/065 365/189.11 |
| 2013/0127507 A1* | 5/2013 | Zhuang ............ | H03K 3/356139 327/203 |
| 2017/0309346 A1* | 10/2017 | Tajalli ................. | G11C 27/02 |
| 2018/0115442 A1* | 4/2018 | Tajalli ..................... | H04L 7/02 |

* cited by examiner

*Primary Examiner* — Juan A Torres

(57) ABSTRACT

Aspects of the disclosure provide an apparatus that includes interface circuitry with a serializer/deserializer (SERDES) circuit. The interface circuitry includes a receiving circuit that receives a signal that carries a sequence of digital values. The receiving circuit includes sampler circuit and a feedback equalization circuit. The sampler circuit includes an amplifying portion and a latch portion coupled at an intermediate node. The amplifying portion varies, with an amplifying gain, an intermediate signal at the intermediate node in response to an input signal to the sampler circuit, and the latch portion generates a digital output based on the intermediate signal at the intermediate node. The feedback equalization circuit is coupled to the intermediate node to vary the intermediate signal at the intermediate node based on a previous digital output from the latch portion of the sampler circuit.

20 Claims, 8 Drawing Sheets

INTERFACE CIRCUITRY

INCORPORATION BY REFERENCE

This present disclosure claims the benefit of priority of U.S. Provisional Application No. 62/566,958, "DATA AND ERROR SLICER DESIGN WITH BUILT-IN DFE TAPS" filed on Oct. 2, 2017, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In some communication systems, serializer/'deserializer (SERDES) is used in interfaces to minimize input/output (I/O) pins and interconnects. An interface generally includes a transmitting portion and a receiving portion. In some examples, the transmitting portion includes a serializer that converts data from a parallel format to a serial format, and transmits the data in the serial format; and the receiving portion includes a deserializer that receives data in the serial format and converts the received data from the serial format to the parallel format.

SUMMARY

Aspects of the disclosure provide an apparatus for wired communication. The apparatus includes interface circuitry with a serializer/deserializer (SERDES) circuit. The interface circuitry includes a receiving circuit configured to receive a signal that carries a sequence of digital values, and detect the digital values. The SERDES circuit then converts the digital values from a serial format to a parallel format. The receiving circuit includes sampler circuit and a feedback equalization circuit. The sampler circuit includes an amplifying portion and a latch portion coupled at an intermediate node. The amplifying portion varies, with an amplifying gain, an intermediate signal at the intermediate node in response to an input signal to the sampler circuit, and the latch portion generates a digital output based on the intermediate signal at the intermediate node. The feedback equalization circuit is coupled to the intermediate node to vary the intermediate signal at the intermediate node based on a previous digital output from the latch portion of the sampler circuit.

In an example, the sampler circuit has a current-mode sense amplifier topology that consumes zero static power.

In some embodiments, the amplifying portion includes a differential amplifier that couples with the latch portion at a first intermediate node and a second intermediate node. The latch portion is configured to generate the digital output based on a voltage difference of the first intermediate node and the second intermediate node. In an example, the feedback equalization circuit includes a first current path that is turned on/off in response to the digital output to draw current from the first intermediate node; and a second current path that is turned on/off in response to an inversion of the digital output to draw current from the second intermediate node. The digital output varies the voltage difference via the first current path and the second current path.

In some embodiments, the feedback equalization circuit includes a first differential pair of transistors configured to draw current from the first intermediate node and the second intermediate node based on a coefficient of a tap when the digital output has a first value; and includes a second differential pair of transistors configured to draw current from the first intermediate node and the second intermediate node based on the coefficient of the tap when the digital output has a second value. In an example, the apparatus includes a digital to analog converter (DAC) configured to generate a pair of voltages according to the coefficient of the tap, the pair of voltages controlling the first differential pair of transistors and the second differential pair of transistors to draw current from the first intermediate node and the second intermediate node based on the coefficient of the tap.

Further in some examples, the feedback equalization circuit includes a first transistor and a second transistor in series that couple source terminals of the first differential pair of transistors to a power rail. The first transistor and the second transistor are respectively controlled by a clock signal and the digital output. In an example, the first transistor that is connected with the power rail is controlled by the digital output.

In an example, the sampler circuit includes a pre-charge switch configured to reset the intermediate node in response to a clock signal.

Aspects of the disclosure provide a method for receiving a signal that carries a sequence of digital values. The method includes receiving, by a sampler circuit having an amplifying portion and a latch portion that are coupled at an intermediate node of the sampler circuit, an input signal. Further, the method includes varying, by the amplifying portion, with an amplifying gain, an intermediate signal at the intermediate node based on the input signal, and varying, by a feedback equalization circuit that is coupled to the intermediate node, the intermediate signal based on a previous digital output from the latch portion. Then, the method includes generating, by the latch portion, a digital output of the sampler circuit based on the intermediate signal that has been varied based on the input signal and the previous digital output.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Aspects of the disclosure provide a receiving circuit for a communication system, such as a communication system with high bandwidth and high data transition rate requirement. The receiving circuit receives signals that carry digital values from a wired communication interface. The receiving circuit includes a sampler circuit to detect digital values from an input signal (e.g., an analog signal that carries a sequence of digital values). The receiving circuit also includes a decision feedback equalizer (DFE) circuit that couples with the sampler circuit to form a feedback loop to reduce inter-symbol interference (ISI). In an embodiment, the DFE circuit couples with the sampler circuit at an internal node of the sampler circuit to reduce delay time in the feedback loop. In addition, in some embodiments, the DFE circuit is configured to insert zero common-mode current. Coupling of the DFE circuit at the internal node of the sampler circuit is configured to not affect the performance of the sampler circuit, such as common mode noise, gain, sensitivity, and the like of the sampler circuit.

Figure 1:
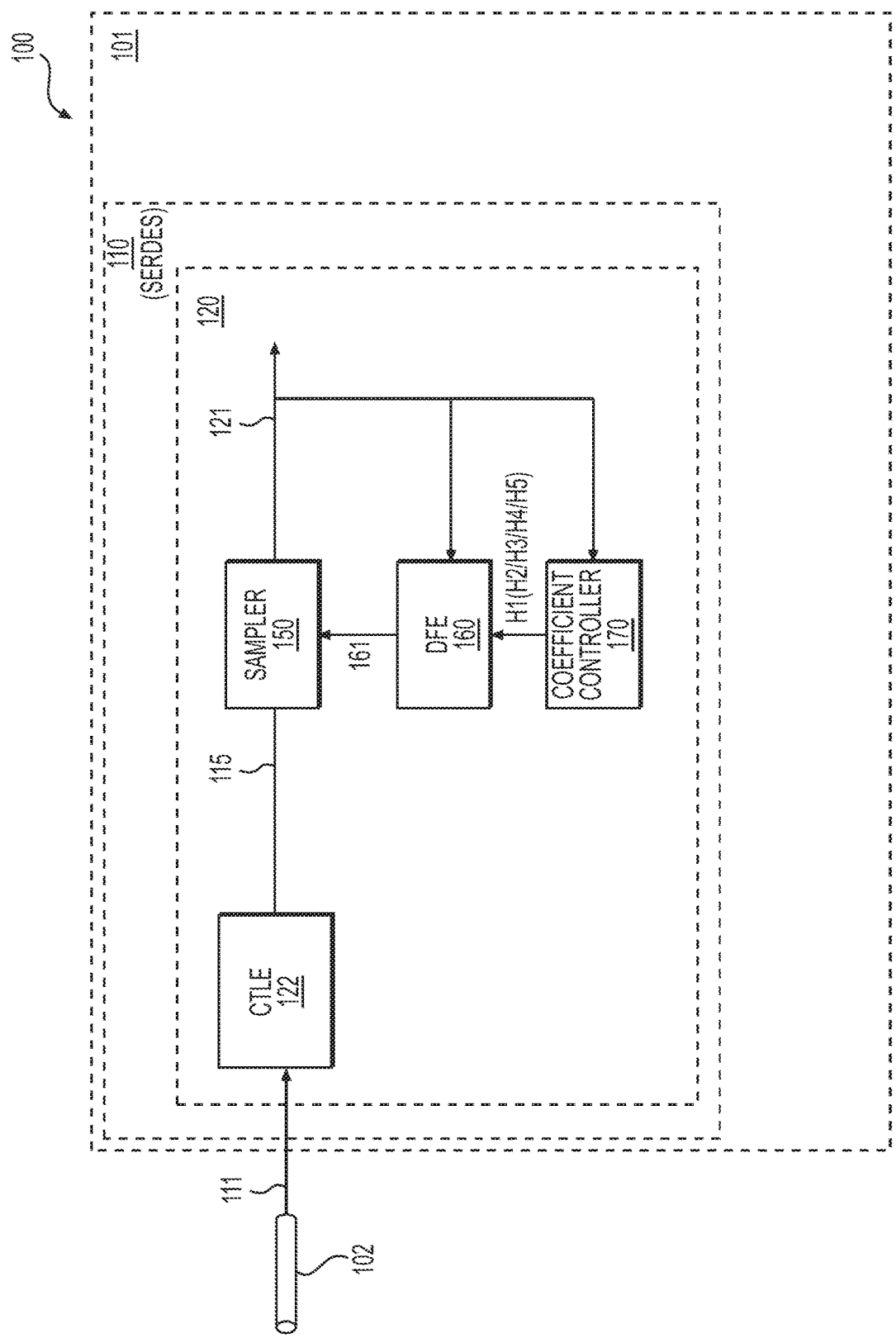
FIG. 1 shows a block diagram of a communication system 100 according to an embodiment of the disclosure.

FIG. 1 shows a block diagram of a communication system 100 according to an embodiment of the disclosure. The communication system 100 includes an electronic device 101 that receives electrical signals from a channel 102. The electronic device 101 includes a receiving circuit 120. The receiving circuit 120 includes a sampler circuit 150 and a decision feedback equalizer (DFE) circuit 160 that are coupled together to form a feedback loop that reduces inter-symbol interference (ISI). The DFE circuit 160 couples to the sampler circuit 150 at an internal node of the sampler circuit 150, such as an intermediate node between an input node and an output node of the sampler circuit 150.

The communication system 100 is any suitable communication system, such as a wired communication system, a telecommunication system, a local area network (LAN), a wide area network (WAN), Ethernet, a data center, a device-to-device communication system, a circuit-to-circuit communication system, and the like. The electronic device 101 is a part of the communication system 100, and receives signals from another device (not shown) in the communication system 100 via the channel 102. In some embodiments, the channel 102 is a wired channel that is formed of suitable transmission mediums, such as transmission wires, copper traces on a printed circuit board (PCB), an Ethernet cable, a universal serial bus (USB) cable, peripheral component interconnect express (PCIe) cable, and the like. In some examples, the channel 102 is a serial communication channel that transmits data in serial format. In an example, the channel 102 transmits a pair of differential signals that carries a bitstream.

The electronic device 101 is any suitable device, such as a network switch, a server device, a router, a desktop computer, a laptop computer, a tablet computer, an integrated circuit (IC) chip, an IC chip package, and the like that includes the receiving circuit 120 to receive incoming signals carrying serial data from the channel 102. In some examples, the receiving circuit 120 is a part of an interface 110, such as a port of network device. The interface 110 includes other suitable circuit (not shown), such as a transmitting circuit, and the like. The interface 110 includes any suitable mechanical and electrical components to couple the channel 102 with the electronic device 101.

In an embodiment, the interface 110 includes a serializer/deserializer (SerDes) that converts data between a serial format and a parallel format. For example, the interface 110 receives serial data from the channel 102, the SerDes converts the serial data to parallel data, and the parallel data is provided to other circuit components (not shown) in the electronic device 101 for further processing. In another example, the SerDes receives parallel data from other circuit components (not shown) in the electronic device 101, and converts the parallel data into serial data. Then, the serial data can be transmitted, for example, by a transmitting circuit (not shown) via the channel 102 or other suitable channel.

According to an aspect of the disclosure, the receiving circuit 120 is configured to have a sufficient timing margin for high bandwidth and high data transition rate. Accordingly, in an embodiment the receiving circuit 120 is configured to receive serial data that is transmitted over the channel 102 with relatively high bandwidth and high data transition rate.

Specifically, the receiving circuit 120 includes a continuous time linear equalizer (CTLE) circuit 122, the sampler circuit 150, the DFE circuit 160 and a coefficient controller 170 coupled together as shown in FIG. 1.

In some examples, the channel 102 has a low pass nature that suppresses high frequency portion of the electrical signals and causes signal distortion. The CTLE circuit 122 is configured to counteract the effects (e.g., low pass effects) of the channel 102. For example, the CTLE circuit 122 is configured to provide increased amplification at one or more certain frequency ranges that have been suppressed, for example by the channel 102. By so doing, frequency response of the channel 102 can be restored to a relatively flat frequency response comparing to without the CTLE circuit 122. For example, the CTLE circuit 122 receives an incoming signal 111 from the channel 102 and outputs a restored signal 115. The incoming signal 111 and the restored signal 115 are analog signals. In some examples, the incoming signal 111 is in the form of a pair of differential signals and the restored signal 115 also is in the form of a pair of differential signals.

In some examples, the sampler circuit 150 is configured to sample the restored signal 115 to generate a sampled signal 121. In some examples, the sampled signal 121 is a digital signal. The sampler circuit 150 can be any suitable sampler circuit. In an example, the sampler circuit 150 is a data sampler, and the sampled signal is a data signal. In another example, the sampler circuit 150 is an error sampler, and the sampled signal is an error signal. In another example, the sampler circuit 150 is an edge sampler, and the sampled signal is an edge signal. It is noted that the sampler circuit 150 is referred to as a slicer circuit in some examples.

Generally, the sampler circuit 150 includes a plurality of transistors. The sampler circuit 150 has an input node to receive, for example the restored signal 115, and has an output node to generate, for example the sampled signal 121. Additionally, the sampler circuit 150 includes intermediate nodes between the input node and the output node, and the intermediate nodes are referred to as internal nodes of the sampler circuit 150 in some examples. In some embodiments, the sampler circuit 150 is implemented using a current-mode latch sense amplifier topology that is also referred to as StrongARM latch topology. The sampler circuit 150 will be described in detail with regard to FIGS. 3-7.

The DFE circuit 160 is configured to generate a decision feedback equalization signal 161 for a present sample based on previous samples (e.g., previous digital values) in the sampled signal 121. In some examples, the decision feedback equalization signal 161 can be expressed as Eq. 1:

$$\text{Feedback}(k) = -\sum_{i=1}^{MT} Hi \times F(k-i) \qquad \text{Eq. 1}$$

where k denotes a positive integer that is a sample index, Feedback(k) denotes the decision feedback equalization signal for the kth sample, i denotes a positive integer that is a tap index, MT denotes the maximum tap, F(k−i) denotes the ith tap for the kth sample and Hi denotes the coefficient for the ith tap. In the FIG. 1 example, the maximum tap is five. For example, for a present sample, the first tap is the sampled signal 121 before a clock cycle, the second tap is the sampled signal 121 before two clock cycles, the third tap is the sampled signal 121 before three clock cycles, the fourth tap is the sampled signal 121 before four clock cycles, and the fifth tap is the sampled signal 121 before five clock cycles, etc.

According to an aspect of the disclosure, the decision feedback equalization signal 161 is combined with the signal for sampling at an internal node in the sampler circuit 150. In some examples, the sampler circuit 150 includes an amplifier portion and a latch portion coupled together at an internal node. The decision feedback equalization signal 161 can be combined with the signal for sampling at the internal node that couples the amplifier portion and the latch portion. The detail of the DFE circuit 160 and the combination of the decision feedback equalization signal 161 with the signal for sampling will be described with reference to FIGS. 3-7.

The coefficient controller 170 is configured to provide coefficients for the taps, such as H1-H5 in the FIG. 1 example. In some examples, the coefficient controller 170 includes an adaptive filter that generates the coefficients based on the sampled signal 121.

According to an aspect of the disclosure, when data rate in the incoming signal 111 increases (e.g., 56G, or 112G SERDES), each time interval (e.g., a clock cycle) becomes shorter, the timing requirement for the first tap and sometime the second tap is relatively strict. Because the decision feedback equalization signal 161 is combined with the signal for sampling at an internal node in the sampler circuit 150, the delay of the feedback loop, is reduced and the timing margin available for circuitry design is increased. Furthermore, in some examples, by combining the decision feedback equalization signal 161 with the signal for sampling at the internal node with zero common-mode current, the coupling of the DFE circuit 160 at the internal node of the sampler circuit 150 does not significantly impact the performance of the sampler circuit 150. For example, the coupling of the DFE circuit 160 at the internal node of the sampler circuit 150 does not introduce common mode noise, does not reduce gain or reduce sensitivity of the sampler circuit 150.

It is noted, in some examples, the receiving circuit 120 is suitably modified. For example, the higher taps, such as the second tap, third tap, fourth tap and fifth tap are fed back before the input nodes of the sampler circuit 150.

Figure 2:
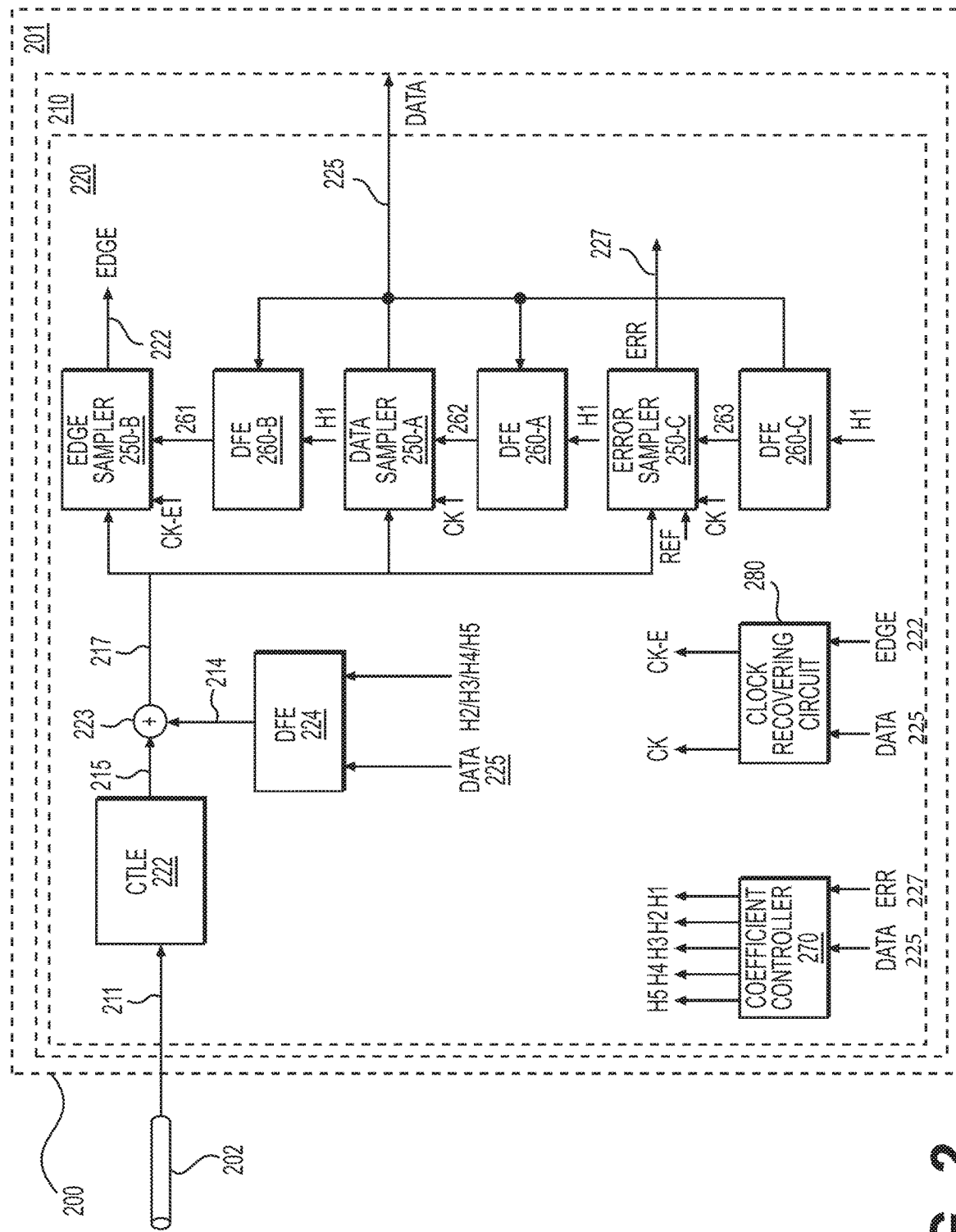
FIG. 2 shows a block diagram of another communication system 200 according to an embodiment of the disclosure.

FIG. 2 shows a block diagram of another communication system 200 according to an embodiment of the disclosure. The communication system 200 includes an electronic device 201 that receives electrical signals from a channel 202. The electronic device 201 includes a receiving circuit 220 that receives an incoming signal 211 from the channel 202 and recovers data and a clock from the incoming signal 211. The receiving circuit 220 includes a CTLE circuit 222, a data sampler circuit 250-A, an edge sampler circuit 250-B, an error sampler circuit 250-C, a plurality of DFE circuits 260A-C for the first tap feedbacks, DFE circuits 224 for higher-tap (e.g., second tap, third tap, . . . ) feedbacks, an adder 223, a clock recovering circuit 280, a coefficient controller 270 coupled together in an embodiment as seen in FIG. 2.

The communication system 200 utilizes certain components that are identical, equivalent or similar to those used in the communication system 100. For example, the channel 202 is equivalent or similar to the channel 102. The interface 210 is equivalent or similar to the interface 110. The CTLE circuit 222 is equivalent or similar to the CTLE circuit 122. The plurality of DFE circuits 260-A to 260-C are respectively equivalent or similar to the DFE circuit 160. The data sampler circuit 250-A, the edge sampler circuit 250-B, and the error sampler circuit 250-C are respectively equivalent or similar to the sampler circuit 150. The coefficient controller 270 is equivalent or similar to the coefficient controller 170. The description of these components has been provided above and will be omitted here for clarity purposes.

In the FIG. 2 example, the CTLE circuit 222 receives the incoming signal 211 from the channel 202, provides increased amplification at one or more certain frequency ranges, and outputs a restored signal 215 with a relatively flat frequency response compared to the incoming signal 211. Further, in the FIG. 2 example, the DFE circuit 224 is configured to generate decision feedback equalization signals 214 of higher taps, such as the second tap, third tap, fourth tap and fifth tap. The decision feedback equalization signals 214 are combined with the restored signal 215 to generate a sample input signal 217. In the FIG. 2 example, the sample input signal 217 is provided to the data sampler circuit 250-A, the edge sampler circuit 250-B, and the error sampler circuit 250-C.

In addition, the plurality of DFE circuits DFE 260-A to 260-C is configured to aenerate the decision feedback equalization signals of the first tap, and the decision feedback equalization signals of the first tap are respectively fed back to respective internal nodes of the data sampler circuit 250-A, the edge sampler circuit 250-B, and the error sampler circuit 250-C. For example, the DFE circuit 260-A is configured to generate a decision feedback equalization signal 262 of the first tap. In an example, the decision feedback equalization signal 262 is combined with a signal for sampling at an internal node of the data sampler circuit 250-A. Similarly, the DFE circuit 260-B is configured to generate a decision feedback equalization signal 261 of the first tap. In an example, the decision feedback equalization signal 261 is combined with a signal for sampling at an internal node of the edge sampler circuit 250-B; the DFE circuit 260-C is configured to generate a decision feedback equalization signal 263 of the first tap. In an example, the decision feedback equalization signal 263 is combined with a signal for sampling at an internal node of the error sampler circuit 250-C. In some examples, the decision feedback equalization signals 261-263 can be respectively expressed as Eq. 2:

$$\text{Feedback}(k) = -H1 \times F(k-1) \qquad \text{Eq. 2}$$

where k denotes a positive integer that is a sample index, Feedback(k) denotes the decision feedback equalization signal for the kth sample, F(k−1) denotes the first tap and H1 denotes the coefficient for the first tap.

In the FIG. 2 example, the data sampler circuit 250-A receives the sample input signal 217 and samples the sample input signal 217 based on a data clock (e.g., CK) to generate a data signal 225; the edge sampler circuit 250-B receives the sample input signal 217 and samples sample input signal 217 based on an edge clock (e.g., CK-E) to generate an edge signal 222; the error sampler circuit 250-C receives the sample input signal 217 and slices the sample input signal 217 according to a reference signal REF to generate an error signal 227.

The coefficient controller 270 is configured to provide coefficients for the taps, such as H1-H5 in the FIG. 2 example. In some examples, the coefficient controller 270 generates the coefficients based on the data signal 225 and the error signal 227. The clock recovering circuit 280 is configured to generate clocks, such as the data clock CK and the edge clock CK-E, based on the data signal 225 and the edge signal 222.

Figure 3:
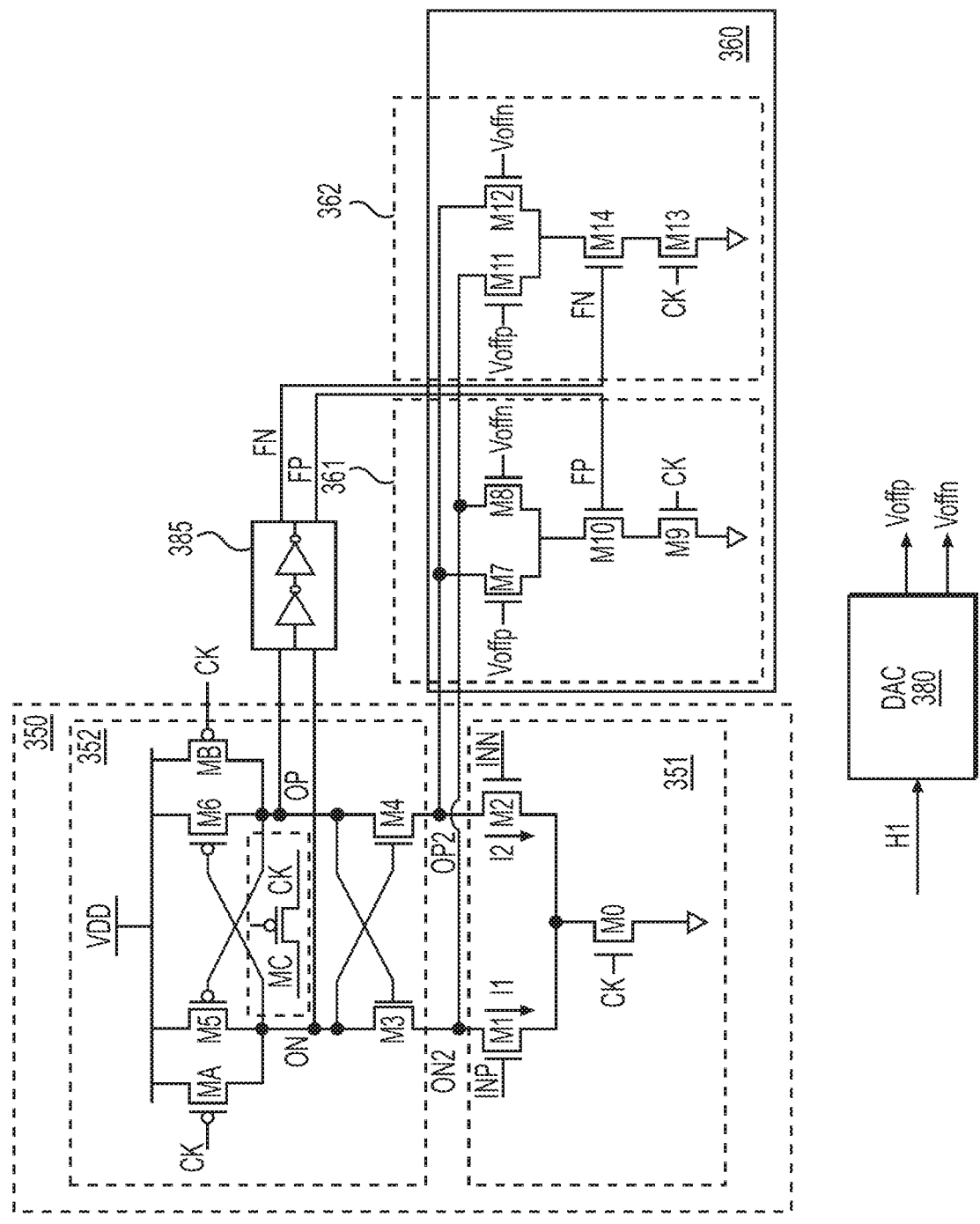
FIG. 3 shows a schematic diagram of a sampler circuit 350 coupled with a decision feedback equalizer 360 for use in the communication systems 100 and 200 according to an embodiment of the disclosure.

FIG. 3 shows a schematic diagram of a sampler circuit 350 coupled with a DFE circuit 360 for use in the communication systems 100 and 200 according to an embodiment of the disclosure. In an example, the sampler circuit 150 and the DFE circuit 160 in FIG. 1 are implemented according to the schematic diagram in FIG. 3. In another example, the edge sampler circuit 250-B and the DFE 260-B are implemented according to the schematic diagram in FIG. 3; the data sampler circuit 250-A and the DFE 260-A are implemented according to the schematic diagram in FIG. 3; the error sampler circuit 250-C and the DFE 260-C are implemented according to the schematic diagram in FIG. 3.

In the FIG. 3 example, the sampler circuit 350 is implemented in a current-mode latch sense amplifier topology. The sampler circuit 350 includes an amplifier 351, and a latch circuit 352 coupled together between a first power rail VDD and a second power rail, such as around as shown in FIG. 3.

In the FIG. 3 example, the sampler circuit 350 receives input signals at input nodes INN and INP, and generates output signals at output nodes ON and OP. The input nodes INN and INP are also inputs of the amplifier 351, and the output nodes ON and OP are also outputs of the latch circuit 352. The amplifier 351 and the latch circuit 352 are coupled together at intermediate nodes ON2 and OP2.

In the FIG. 3 example, the amplifier 352 is a clocked differential amplifier. The amplifier 352 includes N-type transistors M0-M2 that are implemented using metal-oxide-semiconductor field-effect transistors (MOSFETs), and are coupled together as seen in FIG. 3. The N-type transistors M1 and M2 form a differential amplifier, and the N-type transistor M0 is controlled by a clock signal CK to control the operation of the differential amplifier. For example, when the clock signal CK is "0" (e.g., about ground level), the N-type transistor M0 is turned off to shut off power to the differential amplifier and disable the operation of the differential amplifier. When the clock signal CLOCK is "1" (e.g., about VDD level), the N-type transistor M0 is turned on to provide power to the differential amplifier to enable operations of the differential amplifier.

In the FIG. 3 example, during operation when the clock signal CK is about VDD level, the N-type transistors M1 and M2 receive a pair of differential input signals at the input nodes INN and INP. In an example, the differential input signals at the input nodes INP and INN are complementary signals with a middle voltage of VDD/2. The N-type transistors M1 and M2 conduct current based on the polarity of the voltage difference ($V_{INP}$−$V_{INN}$) between the differential input signals at the input nodes INP and INN. For example, when the polarity is positive, the current I1 that flows through the N-type transistor M1 is greater than the current I2 that flows through the N-type transistor M2; and when the polarity is negative, the current I1 that flows through the N-type transistor M1 is less than the current I2 that flows through the N-type transistor M2. In an example, the current difference of the current I1 and I2 is proportional to the voltage difference between the differential input signals at the input nodes INP and INN.

The latch circuit 352 includes N-type transistors M3 and M4, and P-type transistors M5-M6 and MA and MB. The N-type transistor M3 and the P-type transistor M5 form a first inverter, and the N-type transistor M4 and the P-type transistor M6 form a second inverter. The first inverter and the second inverter are cross-coupled to form a current-mode latch. The P-type transistors MA and MB form pre-charge paths that are controlled by the clock signal CK.

In the FIG. 3 example, during operation, the sampler circuit 350 has four phases. For example, when the clock signal CK is low, such as ground level, the sampler circuit 350 enters the first phase. In the first phase, the N-type transistors M0, M1 and M2 are turned off, and the P-type transistors MA and MB are turned on to pre-charge the output nodes ON and OP to VDD.

When the clock signal CK transits from low to high, the sampler circuit 350 enters the second phase. In the second phase, the P-type transistors MA and MB are turned off, and the N-type transistor M0 is turned on, thus the N-type transistors M1 and M2 are turned on, and the amplifier 351 operates to draw the current I1 and UI2 and cause voltages at the intermediate nodes OP2 and ON2 to drop. In addition, due to the differential inputs, a voltage difference at the intermediate nodes OP2 and ON2 is generated and then grows.

When the voltages at the intermediate nodes OP2 and ON2 drop below, for example, VDD−Vthn (Vthn is the threshold voltage of the N-type transistors M3 and M4), the sampler circuit 350 enters the third phase. In the third phase, the N-type transistors M3 and M4 are turned on to draw current from the output nodes ON and OP and cause voltages at the output nodes ON and OP to drop. In addition, due to the differential inputs, a voltage difference at the output nodes OP and ON is generated and then grows.

When the voltages at the output nodes OP and ON drop below, for example, VDD−|Vthp| (Vthp is the threshold voltage of the P-type transistors M5 and M6), the sampler circuit 350 enters the fourth phase. In the fourth phase, the P-type transistors M5 and M6 are turned on. The cross-coupled first inverter and the second inverter pull up one of the output nodes OP and ON to VDD and pull down the other one of the output nodes OP and ON to ground.

In the FIG. 3 example, a buffer circuit 385 is used to drive a tap signal, such as differential tap signals FN and FP. In some examples, the buffer circuit 385 is omitted, and the output nodes ON and OP output the differential tap signals FN and FP.

In the FIG. 3 example, the DFE circuit 360 is configured to generate decision feedback equalization signal in the form of differential current signals.

Specifically, the DFE circuit 360 includes a pair of tap insertion portions, a first tap insertion portion 361 and a second tap insertion portion 362, and one of the two tap insertion portions is selected based on the tap signal, such as the differential tap signals FN and FP. The first tap insertion portion 361 includes a pair of N-type transistors M7 and M8 coupled to the intermediate nodes ON2 and OP2 to apply the decision feedback equalization signal into the sampler circuit 350. The first tap insertion portion 361 is clock-controlled via an N-type transistor M9 and is selected via an N-type transistor M10. The second tap insertion portion 362 includes a pair of N-type transistors M11 and M12 coupled to the intermediate nodes ON2 and OP2 to apply the decision feedback equalization signal into the sampler circuit 350. The second tap insertion portion 362 is clock-controlled via an N-type transistor M13 and is selected via an N-type transistor M14.

In the FIG. 3 example, a DAC 380 is used to convert the coefficient for the first tap H1 to analog signals Voffp and Voffn. The analog signals are used to control the N-type transistors M7, M8, M11 and M12 to draw current from the intermediate nodes ON2 and OP2. It is noted that differential current drawn by the first pair of tap insertion portion 361 has a different polarity from the differential current drawn by the second pair of tap insertion portion 362.

In an example, when the tap signal FN is "0", and the tap signal FP is "1", the first pair of tap insertion portion 361 is selected to draw differential current from the intermediate nodes ON2 and OP2. The differential current is related to the coefficient of the first tap H1, and the polarity of the differential current is a function of the tap signal. The differential current is combined with the current I1 and I2 at the intermediate nodes to change the voltage difference between the intermediate nodes OP2 and ON2.

When the tap signal FN is "1", and the tap signal FP is "0", the second pair of tap insertion portion 362 is selected to draw differential current from the intermediate nodes ON2 and OP2. The differential current is related to the coefficient of the first tap H1, and the polarity of the differential current is a function of the tap signal. The differential current is combined with the current I1 and I2 at the intermediate nodes to change the voltage difference between the intermediate nodes OP2 and ON2.

In some examples, an additional P-type transistor MC is used. The P-type transistor MC is connected with the output nodes ON and OP, and is controlled by the clock signal CK. When the clock signal is "0", the P-type transistor MC is turned on to reset the voltages of the output nodes ON and OP to be the equal.

Figure 4:
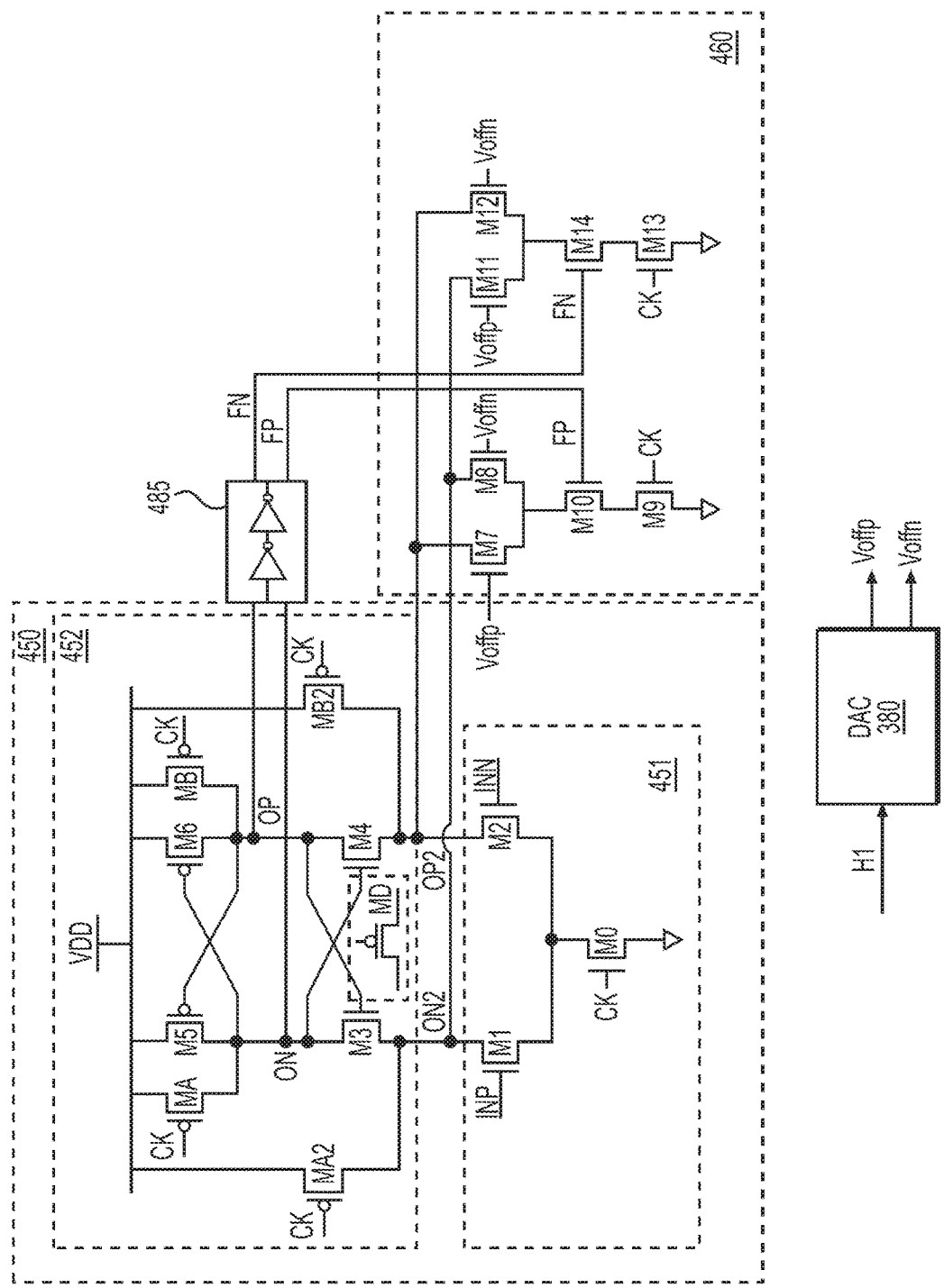
FIG. 4 shows another schematic diagram of a sampler circuit 450 coupled with a decision feedback equalizer 460 for use in the communication systems 100 and 200 according to an embodiment of the disclosure.

FIG. 4 shows another schematic diagram of a sampler circuit 450 coupled with a decision feedback equalizer 460 for use in the communication systems 100 and 200 according to an embodiment of the disclosure. In an example, the sampler circuit 150 and the DFE circuit 160 in FIG. 1 are implemented according to the schematic diagram in FIG. 4. In another example, the edge sampler circuit 250-B and the DFE 260-B in FIG. 2 are implemented according to the schematic diagram in FIG. 4; the data sampler circuit 250-A and the DFE 260-A are implemented according to the schematic diagram in FIG. 4; the error sampler circuit 250-C and the DFE 260-C are implemented according to the schematic diagram in FIG. 4. The buffer circuit 485 and amplifier 451 are identical or similar to the buffer circuit 385 and amplifier 351.

The sampler circuit 450 and the DFE circuit 460 utilize certain components that are identical or equivalent to those used in the sampler circuit 350 and the DFE circuit 360; the description of these components has been provided above and will be omitted here for clarity purposes. In the FIG. 4 example, the sampler circuit 450 includes two additional P-type transistors MA2 and MB2 compared to the sampler circuit 350. The P-type transistors MA2 and MB2 form pre-charge paths to the intermediate nodes ON2 and OP2.

The P-type transistors MA2 and MB2 are controlled by the clock signal CK. When the clock signal is "0", the P-type transistors MA2 and MB2 are turned on and the intermediate nodes ON2 and OP2 are pull up to VDD in the first phase during operation to eliminate the effect of the previous data.

In some embodiments, an additional P-type transistor MD is used. The P-type transistor MD is connected with the intermediate nodes ON2 and OP2, and is controlled by the clock signal CK. When the clock signal is "0", the P-type transistor MD is turned on to reset the voltages of the intermediate nodes ON and OP to be the equal.

Figure 5:
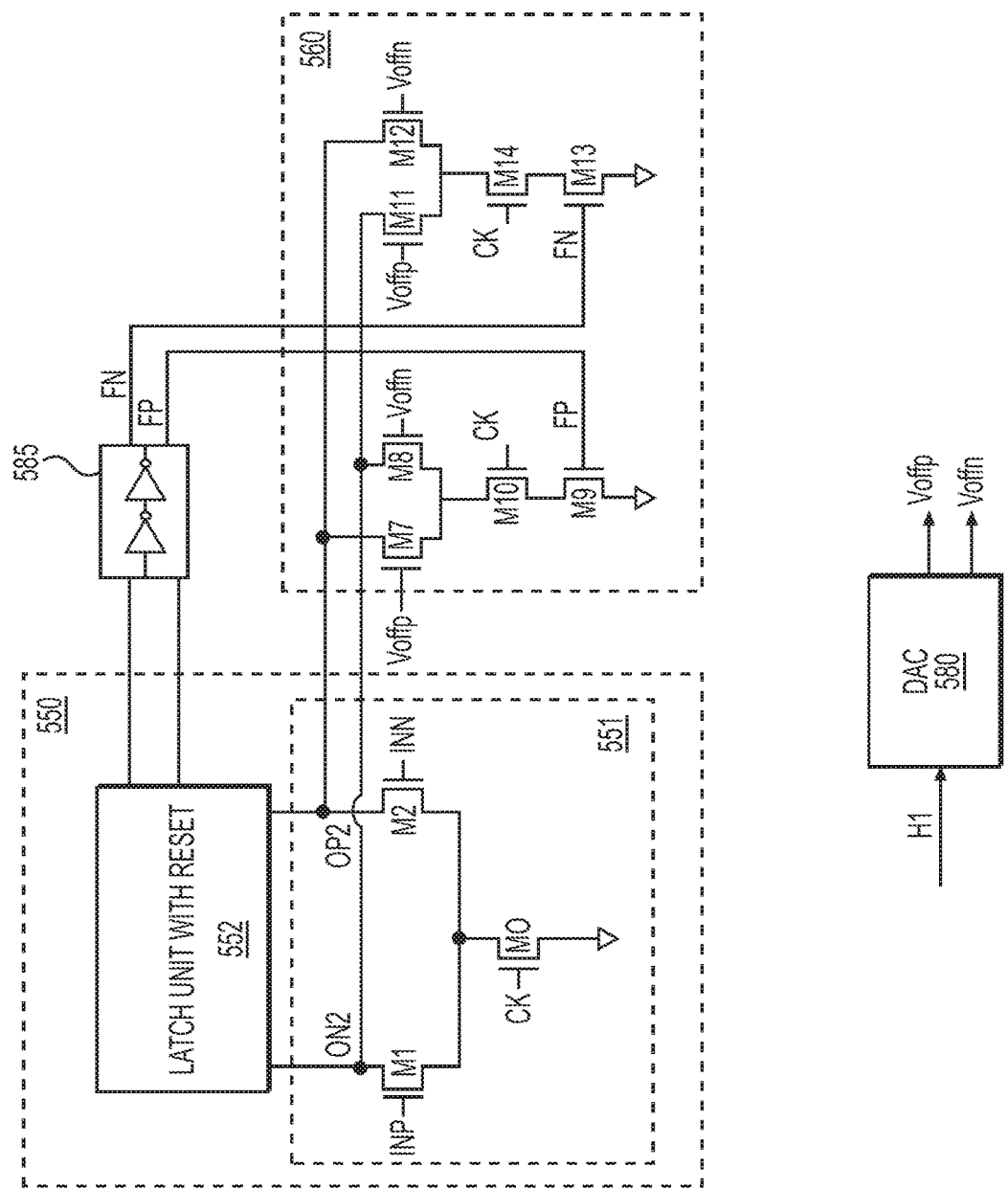
FIG. 5 shows a schematic diagram of a sampler circuit 550 coupled with a decision feedback equalizer 560 for use in the communication systems 100 and 200 according to an embodiment of the disclosure.

FIG. 5 shows a schematic diagram of a sampler circuit 550 coupled with a DFE circuit 560 for use in the communication systems 100 and 200 according to an embodiment of the disclosure. In an example, the sampler circuit 150 and the DFE circuit 160 in FIG. 1 are implemented according to the schematic diagram in FIG. 5. In another example, the edge sampler circuit 250-B and the DFE 260-B in FIG. 2 are implemented according to the schematic diagram in FIG. 5; the data sampler circuit 250-A and the DFE 260-A are implemented according to the schematic diagram in FIG. 5; the error sampler circuit 250-C and the DFE 260-C are implemented according to the schematic diagram in FIG. 5. The buffer circuit 585 is identical or similar to the buffer circuit 385.

In an embodiment, the sampler circuit 550 utilizes certain components that are identical or equivalent to those used in the sampler circuits 350 and 450, and the DFE circuit 560 utilizes certain components that are identical or equivalent to those used in the DFE circuits 360 and 460 For example, the sampler circuit 550 includes an amplifier 551 and a latch circuit 552. The amplifier 551 is identical to the amplifier 351. The latch 552 is similarly configured to the latch 352 or the latch 452. The description of these components has been provided above and will be omitted here for purposes of clarity and brevity.

In the FIG. 5 example, in the DFE circuit 560, the clock signal CK turns on and off the N-type transistors M10 and M14, and the tap signal turns on and off the N-type transistors M9 and M13. In the FIG. 5 example, the requirement for the rising portion of the tap signals FP and FN is relaxed compared to the FIG. 3 and FIG. 4 examples, because the source terminals of the transistors M9 and M13 that are controlled by the tap signals FP and FN are connected to the ground in the FIG. 5 example.

Figure 6:
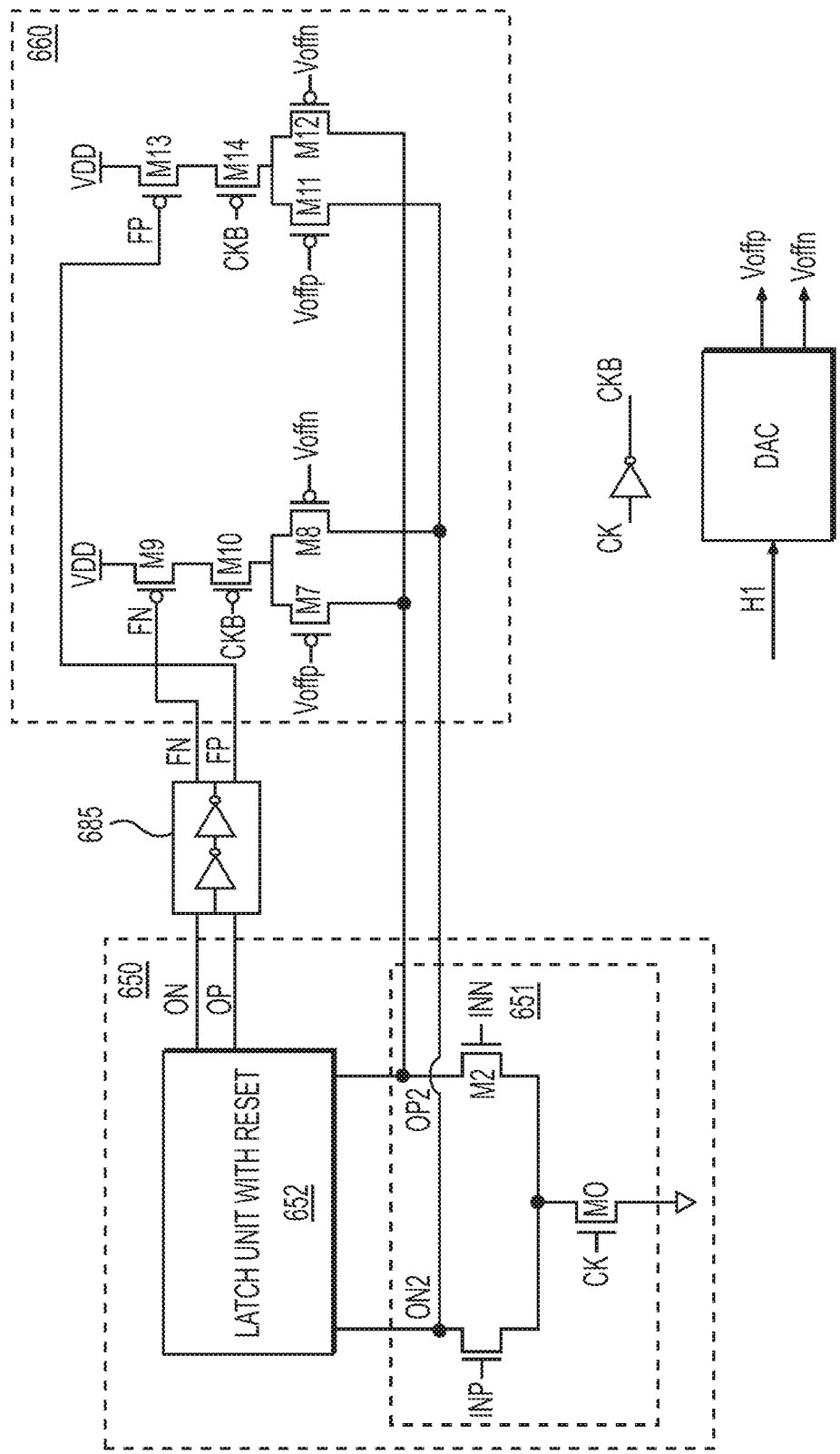
FIG. 6 shows another schematic diagram of a sampler circuit 650 coupled with a decision feedback equalizer 660 for use in the communication systems 100 and 200 according to an embodiment of the disclosure.

FIG. 6 shows another schematic diagram of a sampler circuit 650 coupled with a decision feedback equalizer 660 for use in the communication systems 100 and 200 according to an embodiment of the disclosure. In an example, the sampler circuit 150 and the DFE circuit 160 in FIG. 1 are implemented according to the schematic diagram in FIG. 6. In another example, the edge sampler circuit 250-B and the DFE 260-B in FIG. 2 are implemented according to the schematic diagram in FIG. 6; the data sampler circuit 250-A and the DFE 260-A are implemented according to the schematic diagram in FIG. 6; the error sampler circuit 250-C and the DFE 260-C are implemented according to the schematic diagram in FIG. 6. The buffer circuit 685 is identical or similar to the buffer circuit 385.

In an embodiment, the sampler circuit 650 utilizes certain components that are identical or equivalent to those used in the sampler circuits 350 and 450, and the DFE circuit 660 utilizes certain components that are identical or equivalent to those used in the DFE circuits 360 and 460 For example, the sampler circuit 650 includes an amplifier 651 and a latch circuit 652. The amplifier 651 is identical to the amplifier 351. The latch 652 is similarly configured to the latch 352 or the latch 452. The description of these components has been provided above and will be omitted here for clarity purposes.

In the FIG. 6 example, the DFE circuit 660 is implemented using P-type transistors M7-M14. Thus, in the FIG. 6 example, instead of drawing current from the intermediate nodes ON2 and OP2, the DFE circuit 660 supplies differential current to the intermediate nodes ON2 and OP2. The differential current is then combined with the current of the differential amplifier 651 to change the voltage difference at the intermediate nodes ON2 and OP2.

Figure 7:
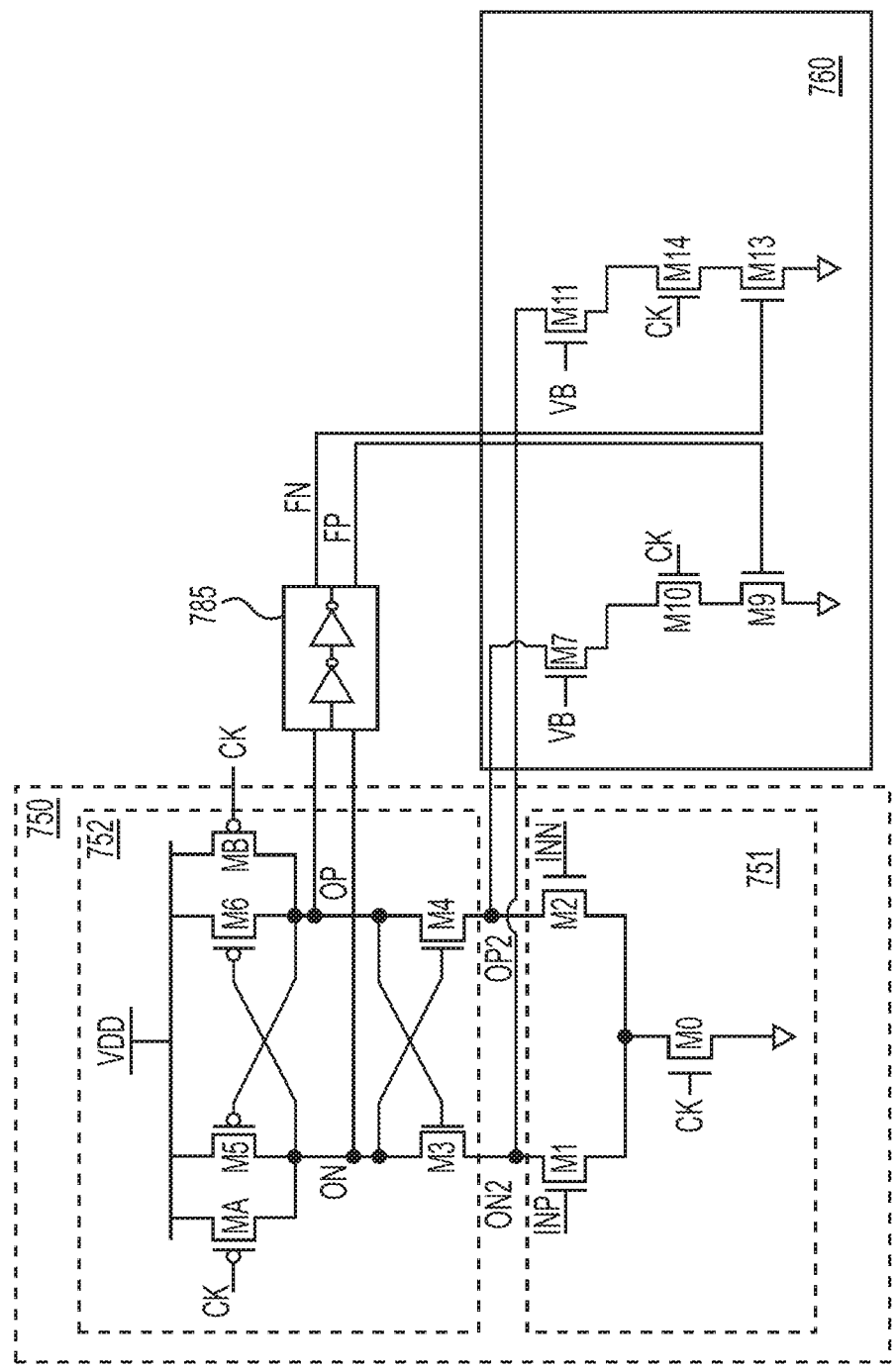
FIG. 7 shows another schematic diagram of a sampler circuit 750 coupled with a decision feedback equalizer 760 for use in the communication systems 100 and 200 according to an embodiment of the disclosure.

FIG. 7 shows another schematic diagram of a sampler circuit 750 coupled with a DFE circuit 760 for use in the communication systems 100 and 200 according to an embodiment of the disclosure. In an example, the sampler circuit 150 and the DFE circuit 160 in FIG. 1 are implemented according to the schematic diagram in FIG. 7. In another example, the edge sampler circuit 250-B and the DFE 260-B in FIG. 2 are implemented according to the schematic diagram in FIG. 7; the data sampler circuit 250-A and the DFE 260-A are implemented according to the schematic diagram in FIG. 7; the error sampler circuit 250-C and the DFE 260-C are implemented according to the schematic diagram in FIG. 7. The buffer circuit 785 is identical or similar to the buffer circuit 385.

The sampler circuit 750 utilizes certain components that are identical or equivalent to those used in the sampler circuits 350. For example, the sampler circuit 750 includes an amplifier 751 and a latch circuit 752. The amplifier 751 is identical to the amplifier 351. The latch 752 is similarly configured to the latch 352. The description of these components has been provided above and will be omitted here for purposes of clarity and brevity.

The DFE circuit 760 includes a first current path that includes N-type transistors M7, M9 and M10 that are connected in series, and a second current path that includes N-type transistors M11, M13 and M14 that are connected in series. The first current path is coupled to the intermediate node OP2, and the second current path is coupled to the intermediate node ON2. The N-type transistor M7 and the N-type transistor M11 are controlled by a bias voltage VB that is generated based on the coefficient of the first tap. The N-type transistors M10 and M14 are controlled by the clock signal CK. The N-type transistors M9 and M13 respectively are controlled by the differential tap signals FP and FN.

In an example, when the tap signal FP is "1", and the clock signal is "1", the first current path is selected and turned on to draw a current from the intermediate node OP2. The second current path is disabled. Similarly, when the tap signal FN is "1", and the clock signal is "1", the second current path is selected and turned on to draw a current from the intermediate node ON2. The first current path is disabled. The configuration with one of the two current paths been disabled is referred to as zero common-mode current injection.

Figure 8:
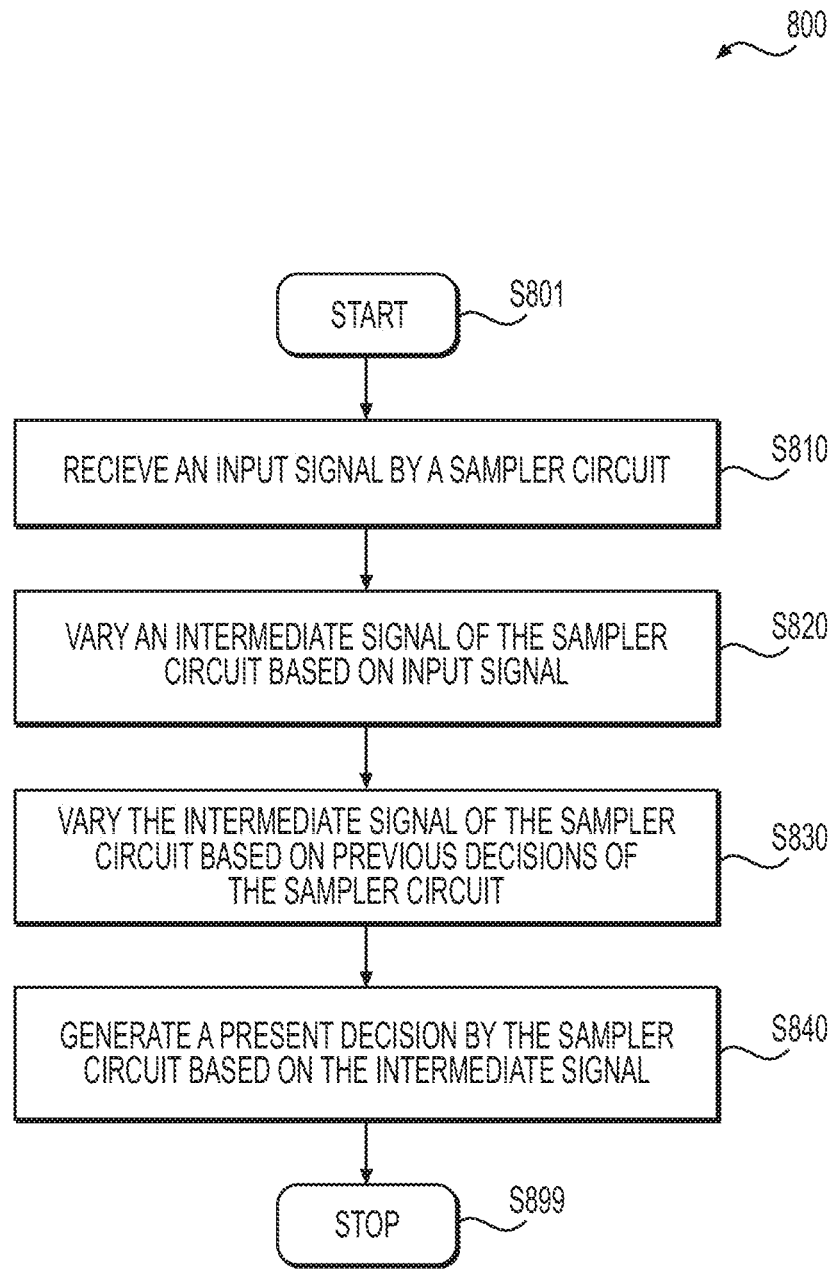
FIG. 8 shows a flow chart outlining a process 800 according to an embodiment of the disclosure.

FIG. 8 shows a flow chart outlining a process 800 for decision feedback equalization according to an embodiment of the disclosure. In an example, the process 800 is executed by a sampler circuit and a DFE circuit, such as the sampler circuit 150 and the DFE circuit 160, the edge sampler circuit 250-B and the DFE circuit 260-B, the data sampler circuit 250-A and the DFE circuit 260-A, the error sampler circuit 250-C and the DFE circuit 260-C, the sampler circuit 350 and the DFE circuit 360, the sampler circuit 450 and the DFE circuit 460, the sampler circuit 550 and the DFE circuit 560, the sampler circuit 650 and the DFE circuit 660, the sampler circuit 750 and the DFE circuit 760, and the like. The process starts at S801 and proceeds to S810.

At S810, an input signal is received by a sampler circuit. In an example, the sampler circuit includes an amplifier and a latch coupled together at an intermediate node. The input signal carries a sequence of digital values. The sampler circuit detects the sequence of digital values.

At S820, an intermediate signal is varied based on the input signal. In an example, the amplifier draws or supplies a current to the intermediate node based on the input signal to cause a voltage change at the intermediate node.

At S830, the intermediate signal is varied based on previous decisions of the sampler circuit. In an example, the DFE circuit generates a decision feedback equalization signal based on one or more the previous decisions (e.g., previous decided digital values) by the sampler circuit. In an example, the decision feedback equalization signal is generated in a current form. In an embodiment, the decision feedback equalization signal (current) is drawn or supplied to the intermediate node to cause voltage to change at the intermediate node.

At S840, a present decision is generated by the sampler circuit based on the intermediate signal. In an example, the latch circuit generates the output based on a voltage at the intermediate node. Then the process proceeds to S899 and terminates.

It is noted that, in an example, the operations S820 and S830 are executed concurrently or according to a different sequence from FIG. 8.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. An apparatus for wired communication, comprising:
a serializer/deserializer (SERDES) circuit that comprises:
a receiving circuit configured to receive a signal that carries a sequence of digital values, and detect the digital values, the receiving circuit comprising:
a sampler circuit having an amplifying portion and a latch portion coupled at an intermediate node, the amplifying portion varying, with an amplifying gain, an intermediate signal at the intermediate node in response to an input signal to the sampler circuit, and the latch portion generating a digital output based on the intermediate signal at the intermediate node; and
a feedback equalization circuit that is coupled to the intermediate node to vary the intermediate signal at the intermediate node based on a previous digital output from the latch portion of the sampler circuit.

2. The apparatus of claim 1, wherein the sampler circuit has a current-mode sense amplifier topology that consumes zero static power.

3. The apparatus of claim 1, wherein:
the amplifying portion includes a differential amplifier that couples with the latch portion at a first intermediate node and a second intermediate node; and
the latch portion is configured to generate the digital output based on a voltage difference of the first intermediate node and the second intermediate node.

4. The apparatus of claim 1, wherein the sampler circuit includes a pre-charge switch configured to reset the intermediate node in response to a clock signal.

5. The apparatus of claim 3, wherein the feedback equalization circuit comprises:
- a first current path that is turned on/off in response to the digital output to draw current from the first intermediate node; and
- a second current path that is turned on/off in response to an inversion of the digital output to draw current from the second intermediate node, the digital output varying the voltage difference of the first intermediate node and the second intermediate node via the first current path and the second current path.

6. The apparatus of claim 3, wherein the feedback equalization circuit comprises:
- a first differential pair of transistors configured to draw current from the first intermediate node and the second intermediate node based on a coefficient of a tap when the digital output has a first value; and
- a second differential pair of transistors configured to draw current from the first intermediate node and the second intermediate node based on the coefficient of the tap when the digital output has a second value.

7. The apparatus of claim 6, further comprising:
- a digital to analog converter (DAC) configured to generate a pair of voltages according to the coefficient of the tap, the pair of voltages controlling the first differential pair of transistors and the second differential pair of transistors to draw current from the first intermediate node and the second intermediate node based on the coefficient of the tap.

8. The apparatus of claim 6, wherein the feedback equalization circuit comprises:
- a first transistor and a second transistor in series that couple source terminals of the first differential pair of transistors to a power rail, the first transistor and the second transistor being respectively controlled by a clock signal and the digital output.

9. The apparatus of claim 7, wherein the first transistor that is connected with the power rail is controlled by the digital output.

10. A method for receiving a signal that carries a sequence of digital values, comprising:
- receiving, by a sampler circuit having an amplifying portion and a latch portion that are coupled at an intermediate node of the sampler circuit, an input signal;
- varying, by the amplifying portion, with an amplifying gain, an intermediate signal at the intermediate node based on the input signal;
- varying, by a feedback equalization circuit that is coupled to the intermediate node, the intermediate signal based on a previous digital output from the latch portion; and
- generating, by the latch portion, a digital output of the sampler circuit based on the intermediate signal that has been varied based on the input signal and the previous digital output.

11. The method of claim 10, further comprising:
- drawing a differential current based on a differential input signal to generate a voltage difference at a first intermediate node and a second intermediate node that couple the amplifying portion with the latch portion of the sampler circuit; and
- generating, by the latch portion, the digital output based on the voltage difference of the first intermediate node and the second intermediate node.

12. The method of claim 11, further comprising:
- turning on/off a first current path in response to the digital output to draw a current from the first intermediate node; and
- turning on/off a second current path in response to an inversion of the digital output to draw current from the second intermediate node, the digital output varying the voltage difference of the first intermediate node and the second intermediate node based via the first current path and the second current path.

13. The method of claim 11, further comprising:
- enabling a first differential pair of transistors to draw current from the first intermediate node and the second intermediate node based on a coefficient of a tap when the digital output has a first value; and
- enabling a second differential pair of transistors to draw current from the first intermediate node and the second intermediate node based on the coefficient of the tap when the digital output has a second value.

14. The method of claim 13, further comprising:
- converting the coefficient of the tap in a digital form a pair of voltages; and
- providing the pair of voltages to control the first differential pair of transistors and the second differential pair of transistors to draw current from the first intermediate node and the second intermediate node.

15. A circuit for wired communication, comprising:
- a receiving circuit configured to receive a signal that carries a sequence of digital values, and detect the digital values, the receiving circuit comprising:
  - a sampler circuit having an amplifying portion and a latch portion coupled at an intermediate node, the amplifying portion varying, with an amplifying gain, an intermediate signal at the intermediate node in response to an input signal to the sampler circuit, and the latch portion generating a digital output based on the intermediate signal at the intermediate node; and
  - a feedback equalization circuit that is coupled to the intermediate node to vary the intermediate signal at the intermediate node based on a previous digital output from the latch portion of the sampler circuit.

16. The circuit of claim 15, wherein the sampler circuit has a current-mode sense amplifier topology that consumes zero static power.

17. The circuit of claim 15, wherein:
- the amplifying portion includes a differential amplifier that couples with the latch portion at a first intermediate node and a second intermediate node; and
- the latch portion is configured to generate the digital output based on a voltage difference of the first intermediate node and the second intermediate node.

18. The circuit of claim 15, wherein the sampler circuit includes a pre-charge switch configured to reset the intermediate node in response to a clock signal.

19. The circuit of claim 17, wherein the feedback equalization circuit comprises:
- a first current path that is turned on/off in response to the digital output to draw current from the first intermediate node; and
- a second current path that is turned on/off in response to an inversion of the digital output to draw current from the second intermediate node, the digital output varying the voltage difference of the first intermediate node and the second intermediate node based via the first current path and the second current path.

20. The circuit of claim 17, wherein the feedback equalization circuit comprises:

a first differential pair of transistors configured to draw current from the first intermediate node and the second intermediate node based on a coefficient of a tap when the digital output has a first value; and
a second differential pair of transistors configured to draw current from the first intermediate node and the second intermediate node based on the coefficient of the tap when the digital output has a second value.

\* \* \* \* \*